Apr. 3, 1923.
P. AUDIANNE
1,450,661
APPARATUS FOR THE MANUFACTURE OF SULPHURIC ANHYDRIDE
Filed July 29, 1920
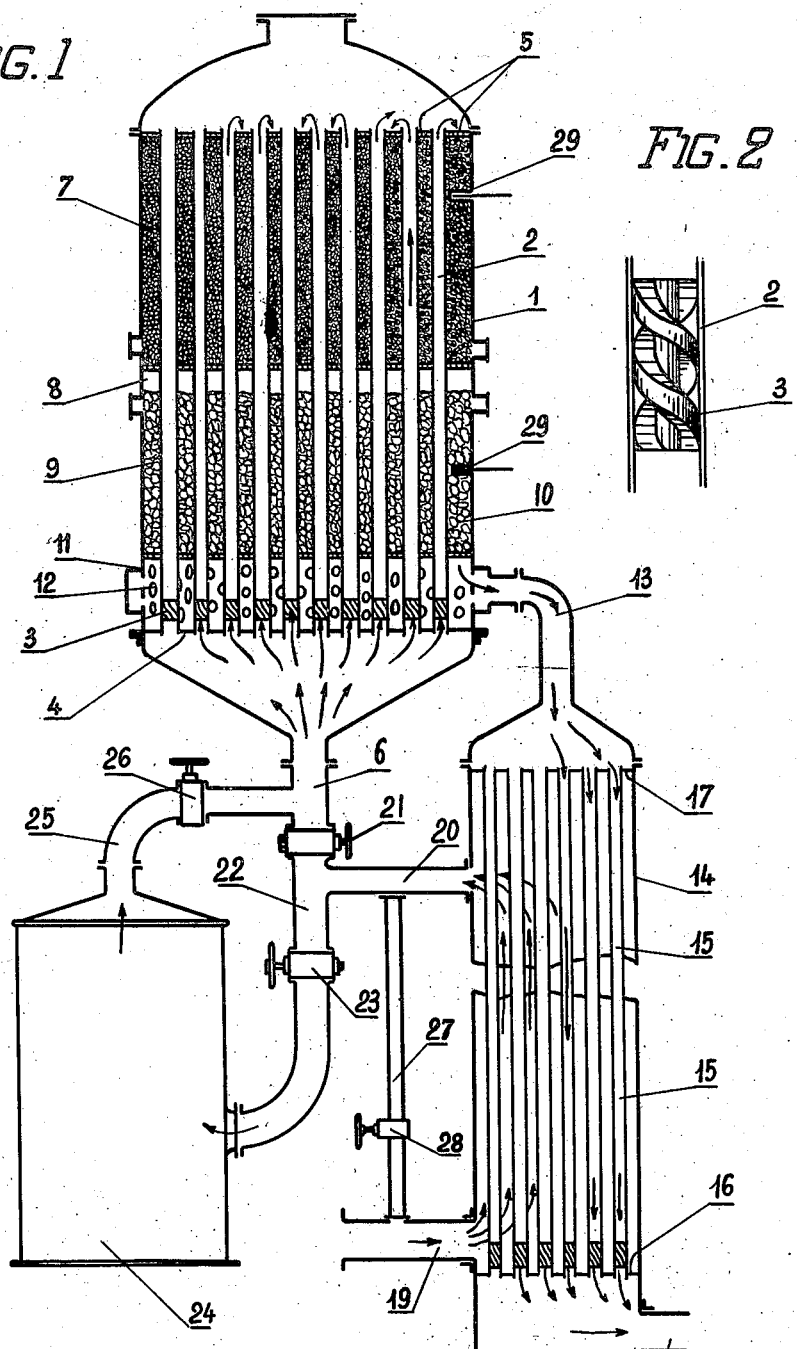
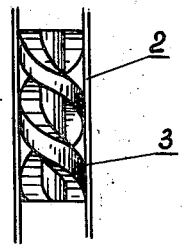

Patented Apr. 3, 1923.

1,450,661

UNITED STATES PATENT OFFICE.

PAUL AUDIANNE, OF PARIS, FRANCE, ASSIGNOR TO ETABLISSENTS KUHLMANN, OF PARIS, FRANCE.

APPARATUS FOR THE MANUFACTURE OF SULPHURIC ANHYDRIDE.

Application filed July 29, 1920. Serial No. 399,714.

*To all whom it may concern:*

Be it known that I, PAUL AUDIANNE, residing at 117, Boulevard Haussmann, Paris, France, have invented certain new and useful Improvements in and Relating to Apparatus for the Manufacture of Sulphuric Anhydride, of which the following is a specification.

This invention relates to an apparatus for the manufacture of sulphuric anhydride by the contact method.

It is known that the latter process for manufacture consists in causing oxygen from the air to act upon sulphurous anhydride at a temperature of about 500°, in the presence of a catalyst which is platinum, generally, in an extremely divided state carried by an inert support such as pumice-stone, asbestos or magnesium sulphate. Since the reaction between oxygen and sulphurous anhydride is an exothermic one, it is possible to dispense with a preliminary heating of the gaseous mixture, but, it has been ascertained that in order to obtain a good working, it is indispensable to have a uniform temperature in the whole mass and a perfectly uniform distribution of the gas through the catalyst. The apparatus hitherto employed for the manufacture of sulphuric anhydride by the contact method may be divided into two classes.

In the first class the contact mass consists of asbestos or other carrier, platinized to the extent of 8% or 10% and requires for a given daily output of the apparatus, a relatively small bulk, whereas in apparatus of the second class which is particularly used in the process of Grillo the contact mass contains only 0.2 to 0.4% of platinum and occupies a great deal of space in the proportion of 1 cubic meter per ton of daily output of anhydride.

Now with known apparatus of this second type which also have considerable advantages, the above stated conditions for efficient working, namely perfect distribution of the gas through the catalytic mass and uniformity of temperature throughout this entire mass, are insufficiently satisfied.

The apparatus according to the present invention while belonging to the second type, avoids this drawback by approximating the construction of the first type of apparatus and it consists essentially of a vertical cylindrical chamber called "catalyser chamber" inside which a plurality of vertical tubes open at both ends are provided. Contrary to what has hitherto been the practice, the catalytic mass is arranged between the tubes, the mixture of sulphurous anhydride and air coming from below, enters and passes upwardly through the tubes and passes downwardly between said tubes through the catalytic mass.

This arrangement has the advantage of enabling a large volume of the mass having a small percentage of catalyst to be used, without being compelled to have a large number of tubes, or tubes having a diameter that is too large to allow the desired thermal exchange to take place properly.

In order to obtain a perfect uniformity of temperature, provision is made for ensuring a constant speed of the flow of gas up and down throughout the whole apparatus.

The mixture of sulphurous anhydride and air entering the tubes is compelled by the conical shape of the lower part of the receptacle 1, to expand and spread out uniformly. Then the flow of gas is slackened by the relatively small diameter of the tubes and the helical plugs of the inlet of the said tubes. On passing downwardly through the catalyst, outside of the tubes, the catalytic reaction takes place with the evolution of heat.

The uniformity of the distribution of the gases throughout the mass continues to be assured by the provision of outlet orifices directed outwards towards an annular collector around the whole periphery of the catalyzer.

It will be seen that the apparatus forms thus a substantially perfect heat exchanger, the cold gases which travel in the tubes 2 being heated by the hot gases which travel between the tubes. The coldest gases which are admitted to the exchanger 14 around the tubes, are heated by the hottest (exit) gases travelling through tubes 15.

Besides the relative dimensions of the apparatus, the diameter and length of the catalyzer, the diameter, length and the number and spacing of the tubes are so selected that the temperature shall remain almost perfectly constant throughout the entire mass of catalyst.

A heating device may be added in the known manner to the apparatus with a view to obtaining the exchange of heat which is necessary for the best working, immediately after starting the apparatus. The mixture of sulphurous anhydride and air is caused to pass through the heating device when starting the apparatus before being caused to pass through the "catalyzer chamber", and the heating device is cut out of the circuit as soon as the reaction is well under way and the temperature inside the catalyzer has been sufficiently raised.

In the accompanying drawings, which illustrate by way of example one mode of carrying the invention into effect, Fig. 1 is a section in elevation of the whole apparatus and Fig. 2 shows at a larger scale the details of a helicoidal stopper inserted in the lower end of each of the tubes as will be hereinafter more particularly referred to.

The apparatus consists essentially of a vertical cylindrical chamber 1 called "catalyzer chamber" inside which is arranged a plurality of vertical tubes 2, the upper ends of which are freely open whilst the lower ends thereof are provided with a helicoidal stopper 3 allowing the gases to enter the tubes after being mixed (see Fig. 2). The tubes are held in proper space relation with each other, at their lower part by means of a tube-sheet (made for example of iron) 4 provided with the number of holes which are necessary for the passage of the tubes. At their upper part the tubes are held by means of a tube-sheet (preferably of iron) 5, whilst the intervals between the holes serving for the passage of the tubes, are pierced with a large number of holes of a small diameter (say about 10 mm.). The lower ends of the tubes 2 which go beyond the plate 4, are in communication with a pipe 6 connected with the lower conical part of the chamber 1. The space between the tubes is filled for part of its height, with the catalyst 7. The latter rests on a sheet-iron 8, which is pierced with a large number of holes of small section between the holes provided for the passage of the tubes 2.

The space between the tubes, for the remaining part of the height, is filled with an inert substance 9 divided into small grains and carried by a sheet-iron 10 similar to the sheet-iron 8. The said sheet-iron 10 separates the mass 9 from an annular collector 11 the internal lateral walls of which are also provided with a plurality of holes 12 and the collector communicates with a second chamber 14, hereinafter more particularly referred to, by means of a pipe 13. A plurality of tubes 29 provided in the walls of the chamber 1 allow the temperature of the mass to be taken at various heights by means of pyrometers.

The diameter of the chamber 1 and consequently the number of the tubes 2 are a function of the power of the catalyst, but the dimensions of the tubes and their spacing are determined so as to produce with the minimum amount of metal, the maximum of efficiency from the point of view of obtaining a regular temperature.

The vertical chamber 14 which acts as a heat-exchanger, comprises like the chamber 1, a plurality of vertical tubes 15 which are held at the lower and upper part by means of tube-sheets 16 and 17; the tubes are placed in communication at their upper part with the chamber 1 through the pipe 13 and at their lower part with an exhaust pipe 18. The space between the tubes is in communication with an inlet pipe 19 at the lower part and with a pipe 20 connected to the pipe 6, at the upper part. A valve 21 allows the said communication to be established or interrupted. For a catalyser of a given power the exchanger 14 has determined dimensions so that the most perfect exchange of heat possible will be obtained. The pipe 6 is continued below the valve 21 by a pipe 22 provided with a valve 23 and leading to a heating device 24. The latter is placed also in communication with the pipe 6 (at the beginning of the operation) through a pipe 25 provided with a valve 26. Lastly a pipe 27 provided with a valve 28 is arranged between the pipe 19 for the inlet of cold gases and the connecting pipe 20, the said pipe 27 allowing part of the cold gases to be directed towards the chamber 1 without traversing the heat-exchanger 14.

The working of the apparatus is as follows:

During the normal operation of the apparatus, the valve 21 is open, the valves 23 and 26 are closed. The mixture of sulphurous anhydride and air enters the heat exchanger 14 through the pipe 19 between the tubes 15, and penetrates into the catalyzer 1 through the pipes 20 and 6: it enters the tubes 2 in which it is uniformly distributed owing to the conical shape of the lower part of the chamber 1 and to the resistance produced by the helicoidal stoppers 3, and goes downwardly between the tubes in contact with catalyst 7; the reaction then takes place, the temperature rises and the gaseous sulphuric anhydride enters the collector 10. The gas travelling upwardly through the tubes, is given a whirling motion in the tubes, by which the heat transfer from the filling material 9 and catalyzer material 7 is increased. This motion is imparted to the gases by the plugs 3. These plugs also aid in causing the incoming gases to spread out more uniformly in the lower end of chamber 1, so that the flow of gases upwardly through all the tubes will be more uniform. If these were omitted, much more gas would pass up through the tubes directly over the pipe 6 than through those near the periphery of chamber 1. It will be seen that the chamber acts as a heat-exchanger, the cold gas which rises inside the tubes being heated by the hot gas which comes down between the tubes, and owing to these exchanges of heat, the temperature is maintained nearly constant in the whole catalyzer mass. The sulphuric anhydride passes then from the receiver 10 into the chamber 14 through the pipe 13, enters the tubes 15 and leaves the chamber 14 through the pipe 18. There is a farther exchange of heat in 14, the hot gases coming down the tubes heating the cold gases which travel upwardly around the said tubes. An excellent working and a very good efficiency of the apparatus are obtained owing to the homogeneousness of the temperature, especially through the catalyzer mass. The adjustment of the temperature in the catalyzer chamber 1 is effected (after the process is started) by opening more or less the valve 28 which allows a portion, more or less great, of the cold gases to pass directly from pipe 18 into the pipe 20, and thence into the catalyzer chamber 1.

For starting the apparatus, when no reaction has yet taken place, it is advisable to heat the gases in order to obtain a good starting. The operation is as follows: the valve 21 is closed, the valves 23 and 26 are open and the mixture of sulphurous anhydride and air traverses the heating device 24 before entering the catalyzer chamber 1. As soon as the reaction has commenced, the heating device is placed out of the circuit by re-opening the valve 21 and by closing the valves 23 and 26.

What I claim is:—

1. An apparatus for the manufacture of sulphuric anhydride by the contact method comprising in combination a chamber, a plurality of vertical tubes in the said chamber, a catalyst placed between and around the said tubes, means for distributing a mixture containing sulfurous anhydride and oxygen inside the said tubes, means for causing the said mixture to rise inside the said tubes, and to flow downwardly through the catalyst, and means for maintaining a substantially uniform temperature throughout the height of the mass of catalyzer material.

2. An apparatus for the manufacture of sulphuric anhydride by the contact method, comprising in combination, a chamber the bottom of which is of conical shape, an inlet orifice for the gas mixture at the apex of the said conical bottom, a plurality of vertical tubes in the said chamber, helical plugs at the lower parts of the said tubes, a catalyst placed between the said tubes, outlet orifices for the gas mixture around the whole periphery of the lower part of the chamber, an annular collector in communication with the said outlet orifices, means for causing the mixture to rise inside the said tubes and to flow downwardly through the catalyst, the diameter and the length of the chamber, the diameter, the length number and spacing of the tubes being adapted for maintaining a substantially constant temperature of gases throughout the depth of the contact mass.

3. In an apparatus for making $SO_3$ by the oxidation of $SO_2$ by a catalyst, the combination of a contact chamber having a gas inlet at its lower part such lower part also constituting a gas distributor, a series of vertical tubes leading upwardly from such gas distributor to near the top of said chamber, such chamber being closed at its top, an inert filling material surrounding the lower parts of said tubes and filling the spaces therebetween, a catalyzer mass having a degree of catalytic activity about equal to that of 0.2 to 0.4% platinized asbestos surrounding the upper parts of said tubes and filling the spaces therebetween, and exit means for treated gases located near the lower end of said chamber but above the gas distributor.

4. A method of oxidizing $SO_2$ by free oxygen, which comprises introducing a gas mixture containing said constituents, into a distributing chamber, causing such gas mixture to travel substantially uniformly upwardly as a number of separate streams within the bulk of a large body of a catalytic material having a degree of activity substantially equal to that of platinized asbestos carrying about 0.2 to 0.4% of platinum, such passage of gas being in heat-conducting relationship with all portions of said mass of catalytic material but not in actual contact therwith, then passing the gases downwardly through and in actual contact with said mass of catalytic material while allowing a transfer of heat from the catalytic material into the upwardly flowing streams of gas mixture, and maintaining the entire body of catalytic material at substantially uniform temperature after the commencement of the process.

5. A method of oxidizing $SO_2$ by free oxygen, which comprises introducing a gas mixture containing said constituents, into a distributing chamber, causing such gas mixture to travel substantially uniformly upwardly as a number of separate streams within the bulk of a large body of a catalytic material having a degree of activity substantially equal to that of platinized asbestos carrying about 0.2 to 0.4% of platinum, such passage of gas being in heat-conducting relationship with all portions of said mass of catalytic material but not in actual contact therewith, then passing the gases downwardly through and in actual contact with said mass of catalytic material while allowing a transfer of heat from the catalytic material into the upwardly flowing streams of gas mixture, and maintaining the entire body of catalytic material at substantially uniform temperature after the commencement of the process, and thereafter passing the gases through a body of inert material, and in contact therewith, while transferring heat from the said gases into the said streams of incoming gas.

In testimony whereof I have signed my name to this specification.

PAUL AUDIANNE.